March 1, 1966 M. F. BROWN 3,237,211
SELF-ATTACHING DUAL FLUSH VALVE ASSEMBLY
Filed Jan. 28, 1963
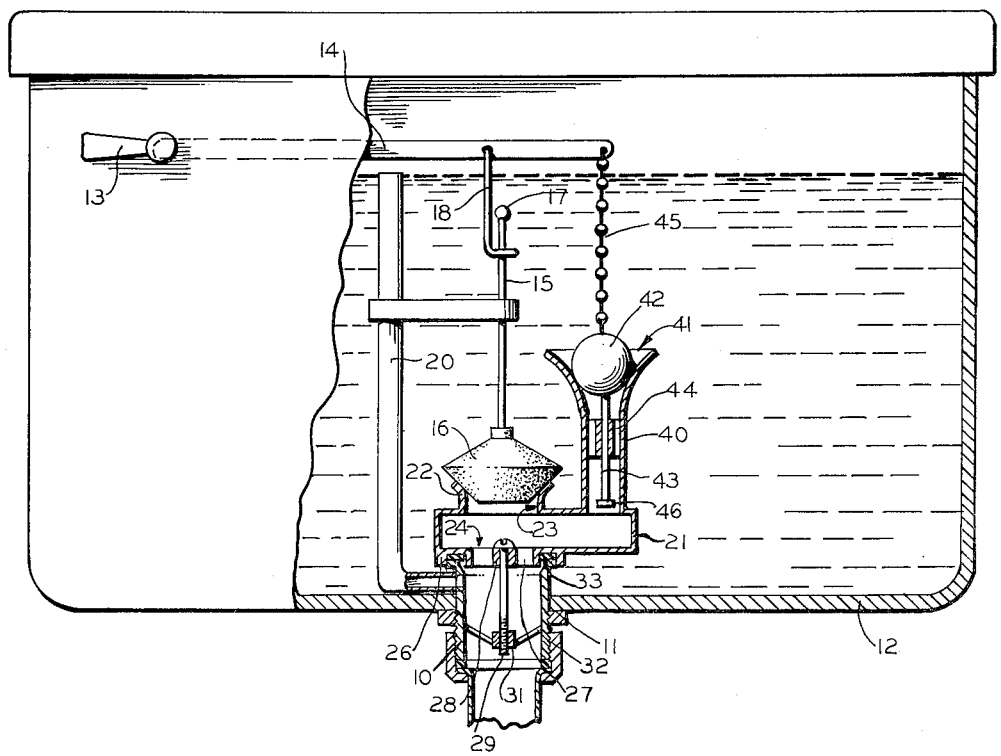
INVENTOR.
MARION F. BROWN
BY
Hoppe and Mitchell
ATTORNEYS

United States Patent Office 3,237,211
Patented Mar. 1, 1966

3,237,211
SELF-ATTACHING DUAL FLUSH
VALVE ASSEMBLY
Marion F. Brown, 255 Miller Ave., Mill Valley, Calif.
Filed Jan. 28, 1963, Ser. No. 254,347
4 Claims. (Cl. 4—34)

This invention relates generally to flush valves for controlling outflow from flush tanks. More particularly, the invention relates to submerged flush valves adapted to discharge liquids from multiple levels.

Flush tanks presently employed in conjunction with toilet bowls wastefully flush the entire contents of the tank each time the toilet bowl is emptied. Improvements in this art have provided for the partial discharge of the flush tank contents in numerous different ways to conserve water. One method includes the employment of various outlet pipes disposed at different levels within the tank, as for example the apparatus described in U.S. Letters Patent No. 2,505,091 issued to E. L. Drebis on April 25, 1950. Such prior art devices have numerous deficiencies. They are difficult to attach to existing installations. They require additional operative equipment to be added to the flush tank. Since two operating handles must be used to discharge varying quantities of water, new handles, connecting means, and lever arms must be added. Furthermore, the stems connected to the various float valves require external guides and attaching brackets for installation. This additional equipment is expensive and difficult to install on existing toilets, which, perhaps, is one reason why the prior art devices have not found widespread use.

This invention is a self-attaching, multiple level valve assembly. It has at least two outlets situated at different discharge levels. It may be used in various types of flush tanks, and it is particularly adapted for installation in the water closets of existing toilets. The valve at one outlet is a float valve of the type normally used in toilets. A second valve, attached to a guide stem slidably guided by internal guide means within a standpipe, controls outflow through a second outlet. Integral attaching means secure the valve assembly on the flush tank outlet. The second valve connects to the valve operating lever by an adjustable, flexible linkage. Dual level flushing is immediately available with practically no installation labor and at a considerable reduction in cost.

Thus, one object of this invention is to provide a self-contained flush valve mechanism, with attaching means, for simple attachment to existing flush tanks.

Another object is to provide a flush valve mechanism having internally guided valve guide stems for ontrolling liquid outflow from tanks at optional levels.

Other objects and advantages of this invention will become apparent from a consideration of the following detailed description and drawing showing one preferred embodiment, wherein:

FIG. 1 is a vertical, sectional view of the present invention shown in a conventional flush tank.

FIG. 1 illustrates this invention attached to an existing toilet facility. An outlet pipe 10 has a lip 11 and drains water from the flush tank 12. The operating handle 13 pivots a flushing lever 14 to lift the stem 15 and tank float valve 16 by engagement with stop 17 on the stem through a connecting rod 18. An overflow pipe 20 communicates with the outlet pipe 10 as is usual in toilet flush tanks.

The valve assembly of this invention has conduit means connecting the outlet pipe 10 with various outlet or discharge levels within the tank. This conduit means is partially defined by a base conduit 21, which has a valve seat 22 forming a valve port 23 for receiving the tank float valve 16. The bottom end of the base 21 has an aperture 24 circumscribed by seating means 26 for engaging the outlet pipe lip 11.

Cross-bars 27, secured to the inside periphery of the aperture 24, support a bolt guide sleeve 28 concentrically with the aperture. Bolt 29 extends down into the outlet pipe 10 with its head resting on the sleeve 28. A threaded spider nut 31 is provided with three upwardly bending prongs 32. These prongs deflect inwardly when the spider nut 31 is thrust down into the outlet pipe 10. They tend to return radially away from the axis of the bolt 29, and grip the inside surface of the outlet pipe 10 when the bolt is turned to pull the spider nut 31 upwardly. A water-tight seal is maintained by a gasket 33 within the seating means 26.

The base conduit 20 supports a standpipe 40 which extends upwardly to a point normally below the tank water level. The elevation of this point may be chosen to allow the discharge of different amounts of water, but preferably the discharge level is chosen to discharge one-half the water in the flush tank 12. The upper end of standpipe 40 has a flared seat defining the valve port 41. Float valve or ball 42 controls flow through port 41. It has a downwardly extending stem 43 slidably engaging at least one stem guide 44 internally mounted within the standpipe 40. Adjustable connecting means 45, for example a chain, connects the top of the float ball 42 with the flushing lever 14. A stop 45 carried on the lower end of stem 43 prevents its complete withdrawal from the standpipe.

This invention is easily installed in an existing flush tank by placing it over the outlet pipe 10, forcing the spider nut 31 down into the outlet pipe 10 and turning the bolt 29 until the prongs 32 tightly grip the inner walls of the outlet pipe. The chain 45 is then connected to the flushing lever 14, as shown. Thus, even the unskilled can easily attach the invention with ordinary household tools.

The toilet then is equipped to conserve water by discharging only a portion of the water in the flush tank. This is accomplished by turning the operating handle 13 approximately one-half of its full arc. This lifts float ball 42 and discharges the tank contents down to the level of the valve port 41. The tank float valve 16 remains seated because the connecting rod 18 placed closer to the flushing lever pivot axis does not move a sufficient distance to engage the stop 17 on the stem 15. When full flushing is desired, a full turn of the operating handle 13 engages the connecting rod 18 with the stop 17. Both valves are then sequentially lifted and the entire contents of the flush tank is discharged through the outlet pipe 10.

Various modifications to the described apparatus may become apparent to those skilled in the art without departing from the true scope of this invention. The foregoing description of a specific embodiment has been given for clearness of understanding only, and no unnecessary limitations should be understood therefrom. The invention is defined in the following claims.

I claim:
1. In a flush tank having an outlet, a tank float valve and control means for operating said float valve, a dual flushing valve assembly including conduit means connecting said outlet pipe with at least two valve ports situated at different levels within said tank, the lowest of said outlets defining a valve seat for seating said tank float valve, a float valve for closing the upper port of said conduit means; a downwardly extending stem attached to said float valve; stem guide on said conduit means for guiding said stem; connecting means connecting said tank float valve and said float valve to said control means for selectively opening and closing said valves; and attaching means for attaching said conduit means to said outlet comprising expanding means mounted upon said conduit means for frictionally gripping the interior surface of said outlet.

2. In a flush tank having an outlet, an operating handle, a flushing lever connected to and operated by rotation of said operating handle, a valve stem connected to and lifted by said flushing lever, and a tank float valve lifted by said valve stem, an improved dual flushing valve assembly including conduit means connecting said outlet pipe with two valve ports situated at different levels within said tank; said tank float valve being used for opening and closing the lower of said ports; a float valve for opening and closing the upper port of said conduit means, said float valve having a depending stem; stem guides mounted within said conduit means for guiding said depending stem; connecting means connecting said float valve with said flushing lever whereby pivoting of said flushing lever sequentially opens said upper valve port and then opens said lower valve port and expandable means for attaching said conduit means to said outlet.

3. In a flush tank having an outlet, an operating handle, a flushing lever connected to and operated by rotation of said operating handle, a valve stem connected to and lifted by said flushing lever, and a tank float valve lifted by said valve stem, an improved dual flushing valve assembly including a base conduit defining a chamber communicating with said outlet and defining a communicating valve port having a first valve seat for receiving said tank float valve; a second float valve having a downwardly extending stem; a standpipe communicating with said base conduit and defining a second valve seat for receiving said second float valve; a stem guide internally mounted within said standpipe for slidably guiding said stem to seat said second float valve in said second valve seat; connecting means connecting said second float valve to said flushing lever, and attaching means for attaching said base conduit to said outlet comprising a spider coaxial with respect to said outlet and having flexible prongs deflectable radially outwardly from the common axis of said spider and said outlet to frictionally grip said outlet, and means to control deflection of said prongs.

4. An improved valve assembly as described in claim 3 wherein said attaching means comprises a bolt; a bolt guide mounted within said base conduit for aligning said bolt coaxially with said outlet; and a spider nut having upwardly diverging radial prongs of a length greater than a radius of said outlet for gripping the interior surface of said outlet when said bolt is turned to pull said spider nut toward said bolt guide along the axis of said outlet.

References Cited by the Examiner
UNITED STATES PATENTS

| 1,767,043 | 6/1930 | Blaun et al. | |
| 1,867,262 | 6/1932 | Howle | 4—57 |
| 2,760,206 | 8/1956 | Loyd | 4—57 |
| 2,803,833 | 8/1957 | Charest. | |
| 2,832,963 | 5/1958 | Minella | 4—57 |
| 2,940,084 | 6/1960 | Fabbi et al. | 4—57 |

LAVERNE D. GEIGER, *Primary Examiner.*

EDWARD V. BENHAM, LEWIS J. LENNY,
*Examiners.*